(12) United States Patent
Grandy (10) Patent No.: US 7,255,060 B2
(45) Date of Patent: Aug. 14, 2007

(54) OWL WITH SPRING CONNECTED HEAD AND WIND ACTIVATED FIN

(75) Inventor: Jan L. Grandy, Waco, TX (US)

(73) Assignee: Easy Gardener Products, Inc., Waco, TX (US)

( * ) Notice: Subject to any disclaimer, the term of this patent is extended or adjusted under 35 U.S.C. 154(b) by 0 days.

(21) Appl. No.: 11/296,982

(22) Filed: Dec. 7, 2005

(65) Prior Publication Data

US 2007/0125293 A1   Jun. 7, 2007

(51) Int. Cl.
*A01M 29/00* (2006.01)
(52) U.S. Cl. .................................. 116/22 A; 446/199
(58) Field of Classification Search ............. 116/22 A; 40/411, 412, 414, 417, 439, 440; 446/311, 446/330, 365, 376, 379, 381, 382, 383, 384, 446/391, 199, 201; 43/2, 3; D11/162; D21/606
See application file for complete search history.

(56) References Cited

U.S. PATENT DOCUMENTS

| | | | |
|---|---|---|---|
| 278,461 A | | 5/1883 | Screven |
| 954,288 A | | 4/1910 | Holloway |
| 1,066,045 A | | 7/1913 | Pass |
| 1,167,502 A | | 1/1916 | Huffman et al. |
| D50,230 S | * | 1/1917 | Cady ......................... D21/606 |
| 1,286,380 A | | 12/1918 | Matthews |
| 1,287,968 A | | 12/1918 | Greenleaf |
| D54,456 S | * | 2/1920 | Rush ......................... D21/606 |
| 2,196,078 A | * | 4/1940 | Pearce .............................. 43/3 |
| 2,545,801 A | | 3/1951 | Wrazen |
| 2,575,252 A | | 11/1951 | Berger |
| 2,689,431 A | * | 9/1954 | Beebe ......................... 446/379 |
| 2,722,195 A | | 11/1955 | Rockafeller |
| 3,085,545 A | | 4/1963 | Ore |
| 3,290,817 A | | 12/1966 | Kravath |
| D214,278 S | * | 5/1969 | Thompson .................. D11/160 |
| 3,487,569 A | | 1/1970 | Mendall |
| 3,526,991 A | * | 9/1970 | Goldfarb et al. ............ 446/177 |
| 3,540,150 A | * | 11/1970 | Hollingsworth et al. .... 446/381 |

(Continued)

FOREIGN PATENT DOCUMENTS

GB   2282518 A   4/1995

(Continued)

OTHER PUBLICATIONS

Motion Scarecrows, Inc., Stop Bird Problems, http://www.nobirds.com/products.html, Printed From Internet Dec. 5, 2005; 2 pgs.

(Continued)

*Primary Examiner*—Alexander R. Smith
(74) *Attorney, Agent, or Firm*—O'Keefe, Egan, Peterman & Enders LLP (57) ABSTRACT

A predator replica is provided that has a moveable head. The head rotates and also has a spring actuated multidimensional movement for deterring pests, particularly unwanted birds. The predator head is provided with a wind activated fin. The fin increases the probability of head movement. The spring provides a "bobble" movement of owl head. The head suspends over the body with a gap between the head and body providing clearance to allow for the spring actuated head movement.

20 Claims, 6 Drawing Sheets

U.S. PATENT DOCUMENTS

| | | | |
|---|---|---|---|
| 3,566,535 A * | 3/1971 | Handler et al. ............ 446/381 |
| 3,735,514 A | 5/1973 | Asder |
| 3,818,630 A | 6/1974 | May |
| 4,038,639 A | 7/1977 | Kuebler |
| 4,131,079 A | 12/1978 | Rousseau, Jr. et al. |
| 4,239,825 A | 12/1980 | Kaulfuss et al. |
| 4,597,357 A | 7/1986 | LeMessurier |
| 4,734,074 A | 3/1988 | Kinberg et al. |
| 4,893,428 A * | 1/1990 | Gagnon, Sr. ................. 43/3 |
| 5,112,265 A | 5/1992 | Naum |
| 5,274,942 A | 1/1994 | Lanius |
| 5,289,654 A | 3/1994 | Denny et al. |
| 5,450,063 A | 9/1995 | Peterson et al. |
| D366,451 S * | 1/1996 | Farstad .................... D11/162 |
| 5,892,446 A | 4/1999 | Reich |
| 5,901,491 A | 5/1999 | Caldwell |
| 5,966,075 A | 10/1999 | Blanks |
| 6,092,322 A * | 7/2000 | Samaras ..................... 43/2 |
| 6,149,490 A | 11/2000 | Hampton et al. |
| 6,407,670 B1 | 6/2002 | Dysarsz et al. |
| 6,575,597 B1 | 6/2003 | Cramer et al. |
| 7,025,655 B2 * | 4/2006 | Chase ....................... 446/392 |
| 2004/0116042 A1 * | 6/2004 | Emoff ....................... 446/384 |
| 2006/0119482 A1 | 6/2006 | Hanscom |

FOREIGN PATENT DOCUMENTS

| | | |
|---|---|---|
| JP | 63317037 | 12/1988 |
| JP | 406292495 A | 10/1994 |
| JP | 2002078440 A | 3/2002 |
| WO | WO03/059058 A1 | 7/2003 |

OTHER PUBLICATIONS

"Motion Activated Owl", dated Feb. 3, 2004, from the website of Burgees, p. 1 as printed from the Internet on Nov. 11, 2006.

"Motion Activated Owl Bird Deterrent", dated Aug. 5, 2004, from the website Nobirds of Motion Scarecrows, Inc., Item No. 101, p. 1 as printed from the Internet on Dec. 5, 2005.

* cited by examiner

OWL WITH SPRING CONNECTED HEAD AND WIND ACTIVATED FIN

TECHNICAL FIELD OF THE INVENTION

This invention relates to a predator replica designed to control pests within a specific area, particularly unwanted birds that may destroy gardens, nest in gutters of a home, or leave guano or other messes behind.

BACKGROUND

Certain predator replicas, such as owl replicas, are used for controlling pests within a specific area, particularly unwanted birds that may destroy gardens, nest in gutters of a home, or leave guano or other messes behind. Current owl replicas include stationary owls with no moving parts and owls having limited movement, for example head rotation. Some current owl replicas comprise heads or arms that move or open electronically. Known in the art are owl replicas having a body and head that generally correspond to shape of a live owl, wherein the head is connected to the body by an unstable mount to allow for various movements of the head, like nodding and turning. Such heads may have movement that is wind driven. The prior art owls, in an effort to resemble a live owl, such as a great horned owl, may also include coloring, body, tail and feather contours of a live owl. Other features of the prior art owls include feet, eyes, a beak, and ear tufts that protrude on top of the head. These features generally provide aesthetic elements to more closely resemble native predators.

SUMMARY OF THE INVENTION

An owl replica with a head, comprising a fin attachment, and a spring for connecting the head to a body is disclosed herein. The fin acts as a wind catching feature to increase head movement and the spring-mounted head creates multidimensional "bobble" movement of the head for intimidating pests. More specifically, the owl includes a body attachment mechanism and a head attachment mechanism for connecting the head to the body via a spring creating a "bobble" movement of the head in addition to rotational movement. Such a design increases duration and range of head movement. The owl head with a wind activated fin departs from the conventional concepts and designs of the current art, and in doing so, provides an apparatus primarily developed for the purpose of deterring pests, particularly unwanted birds, from a specific area, by increasing the probability of the owl's head movement, duration of the head movement, and range of the head movement. The head of the owl replica is attached via the spring and a body attachment mechanism in a suspended position above the body to allow for ample range of head movement, particularly "bobble" movement of head, provided by the spring.

In one embodiment, a fin is vertically attached to an exterior of a head via a vertical slot in the exterior of the head. Further, in one embodiment, the fin is detachable. The owl of the present invention can comprise a body and head with a spring for connecting the body to the head. The spring may be engaged to the head and the body in a manner that allows the head to rotate about a central vertical axis of the owl while also allowing for multi-dimensional head movements, including at least vertical, diagonal, and horizontal movements such as "bobble" movements of the head. As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
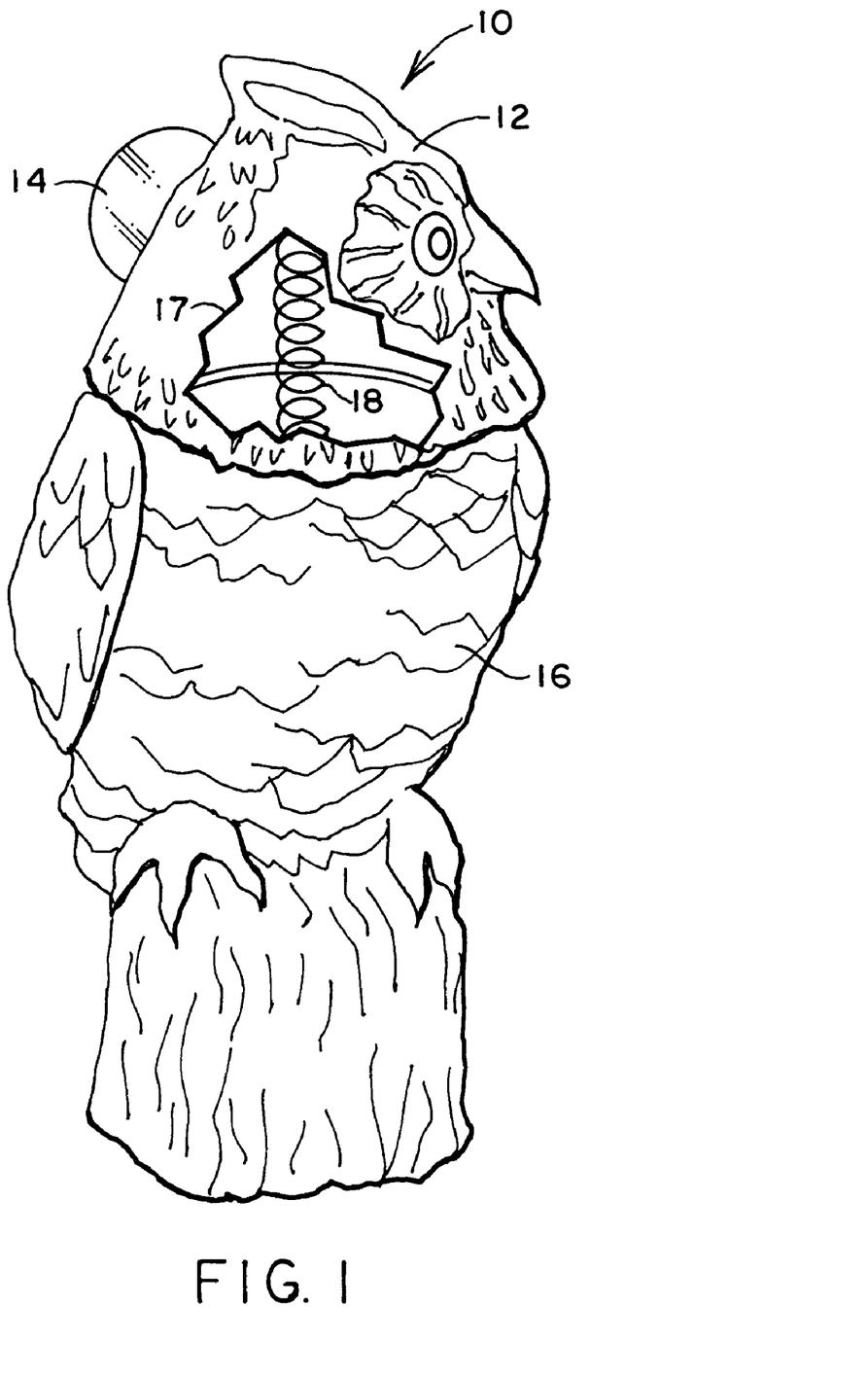
FIG. 1 shows a side view of the owl of the present invention.

A predator replica that allows for multi-dimensional head movements and has a wind-activated fin to increase the probability and range of movement of the owl's head is provided. Referring to the drawings, FIG. 1 shows one embodiment of a side view of the predator replica in which the predator is an owl. In FIG. 1, a new and improved owl for deterring other birds and similar pests is illustrated and will be described. The predator 10 has a head 12, with a fin 14, and a body 16. For illustrative purposes a cut-out region 17 of the head 12 is provided so that a spring 18 may be seen inside the head 12 of the figure. It will be recognized that the cut-out region 17 is just shown for illustrative purposes of the figures and in actually implementation the head would not have a cut-out region. The body 16 is attached to the head 12 via a spring 18. Body attachment and head attachment mechanisms (not shown in FIG. 1) may be utilized to connect the spring 18 to the body 16 and the head 12 as is described in more detail below.

Figure 2A:
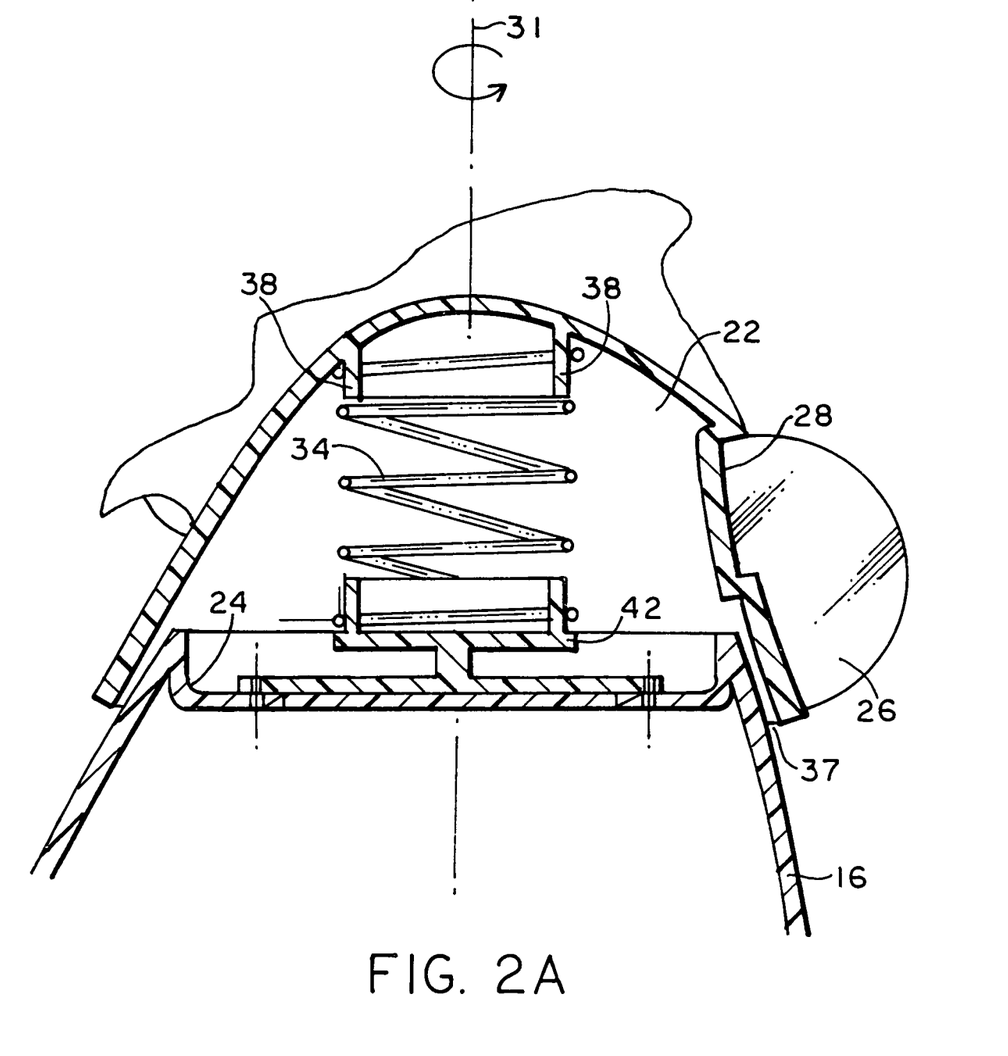
FIG. 2A shows a cross-sectional view of the owl head of the present invention.

FIG. 2A shows a cross-sectional view of one embodiment of the predator configured as an owl. The owl head 22 may have a fin 26 attached vertically to the head 22. The fin 26 may be attached via a vertical slot 28 in an exterior of the head 22. As will be described in more detail below, the head 22 may rotate around a central vertical axis 31 of the owl. Wind may active movement of the head 22 and the fin 26 may better enable such movement by providing a surface to engage the wind. Both the owl head and the owl body may be hollow and formed of molded plastic materials. The body 16 may include an upper region 24 for connecting the body to the head. More particularly, the head 22 is attached to the body 16 via a spring 34. The spring 34 allows for multidimensional movement of the head relative to the body in vertical, horizontal and diagonal directions (in this manner a "bobble" movement of the head 22). The spring 34 is connected to the top interior of the head 22 via a head attachment mechanism 38 and extends vertically downward within the head 22, connecting to a body attachment mechanism 42. The body attachment mechanism 42 is connected to the upper region 24 of the body. Because the head 22 is suspended above the body via the spring 34 and a gap 37 exists where the head 22 extends down over the body 16, a multidimensional bobble movement (in addition to the rotational movement described below) is allowed.

Figure 2B:
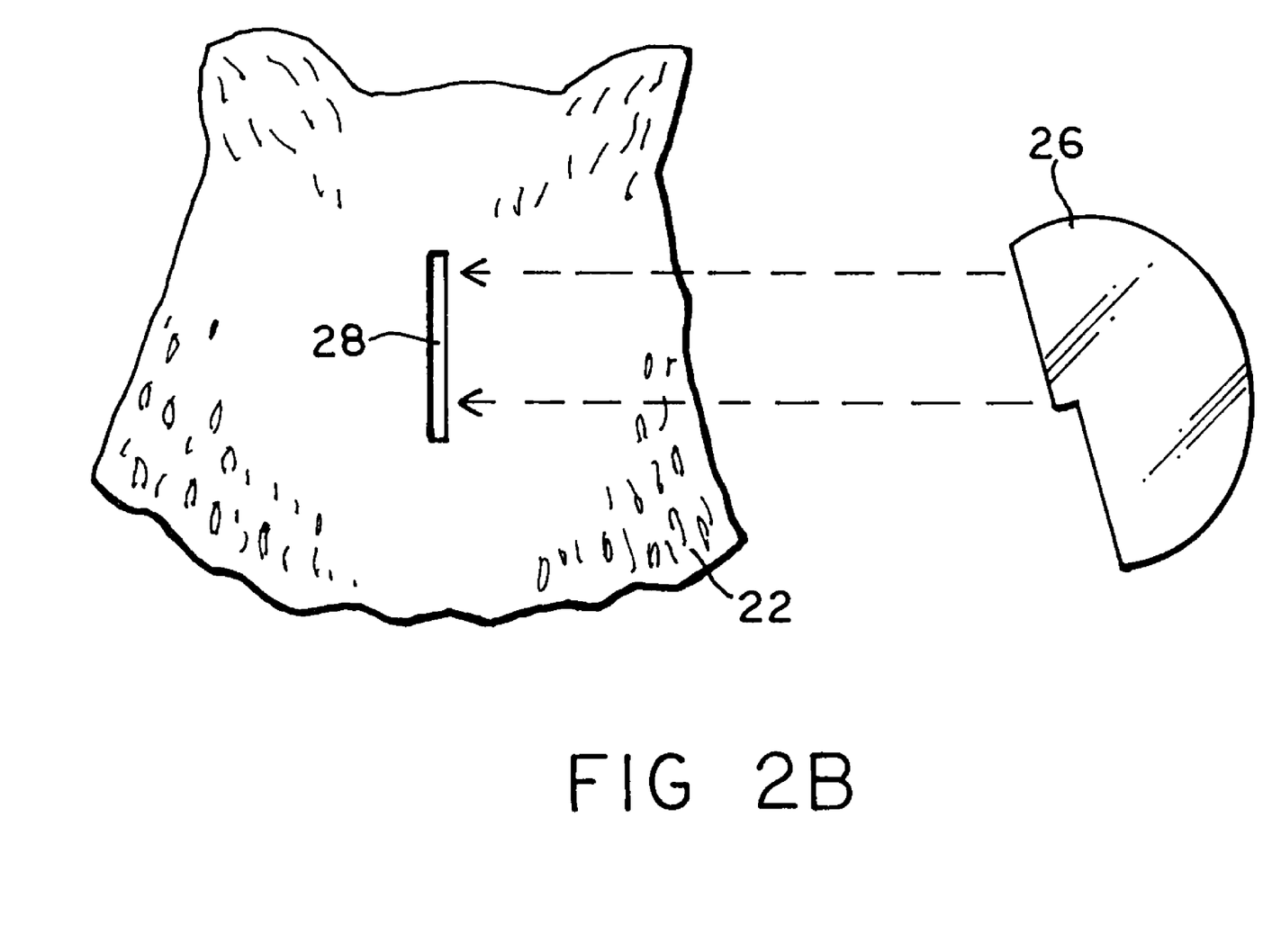
FIG. 2B shows an exterior view of the owl head of the present invention.

FIG. 2B shows an exterior view of the back of the owl head 22 showing the vertical slot 28 for connecting with the fin 26 to the head 22. The fin 26 may also be alternatively integrally formed with the head 22. The fin 26 could be colored to match the coloring of the head 22 or can be clear so as not to distort or alter the appearance of the owl head 22. In one embodiment, the fin 26 is detachable. This may be useful during periods of high winds or high wind locations where the additional movement imparted by the fin is not necessary.

Figure 3A:
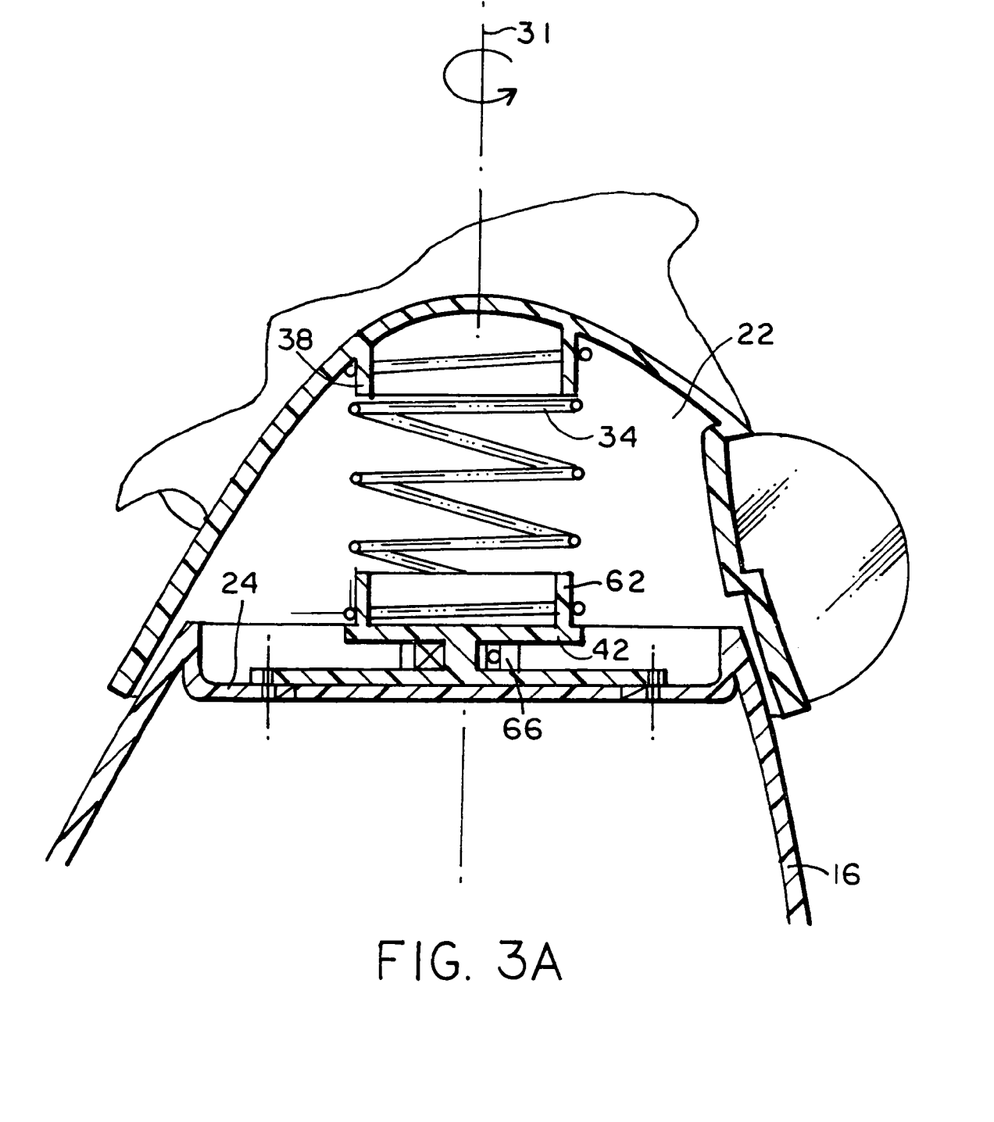
FIG. 3A shows a cross-sectional view of the owl head, and specifically shows placement of rotational engagements at a base of a body attachment mechanism of the present invention.
Figure 3B:
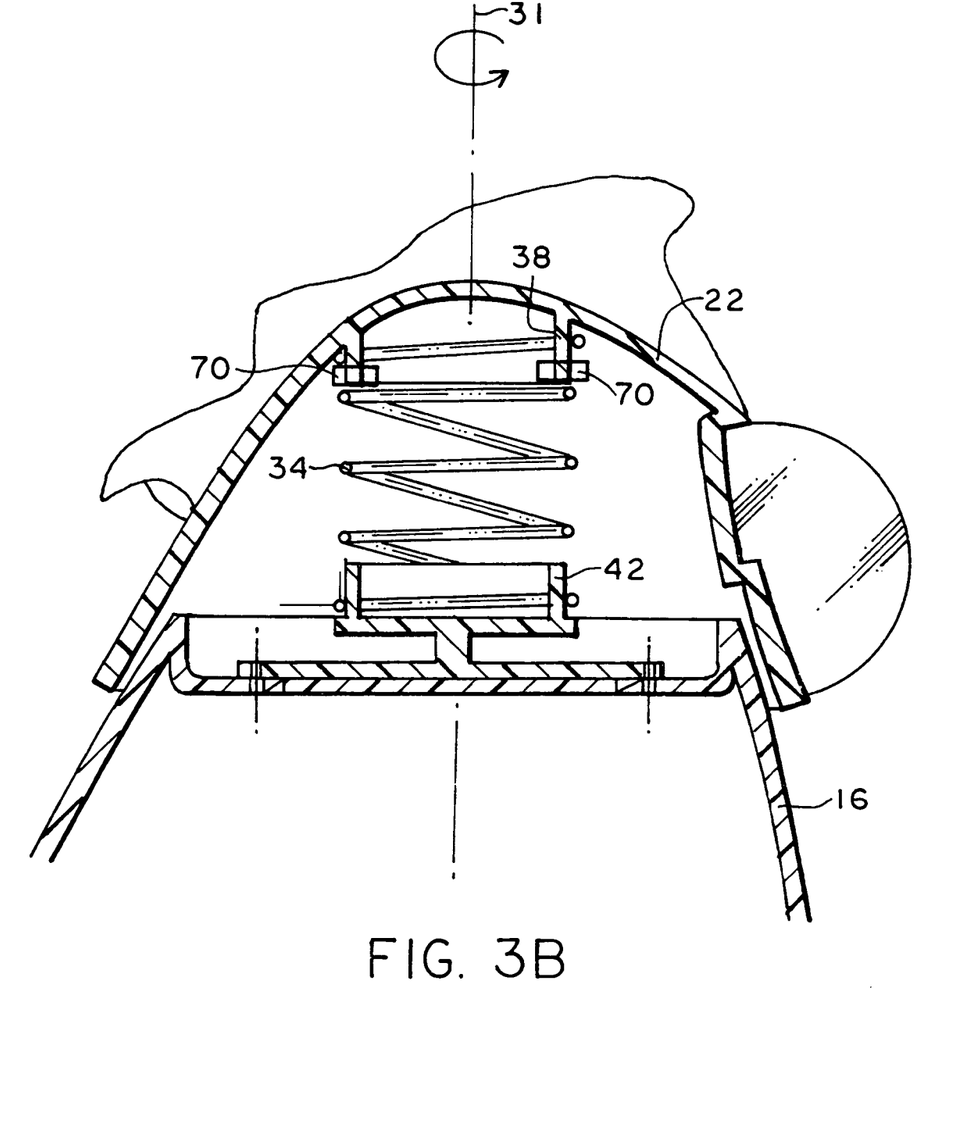
FIG. 3B shows a cross-sectional view of the owl head of the present invention with rotational engagements located on a head attachment mechanism.
Figure 3C:
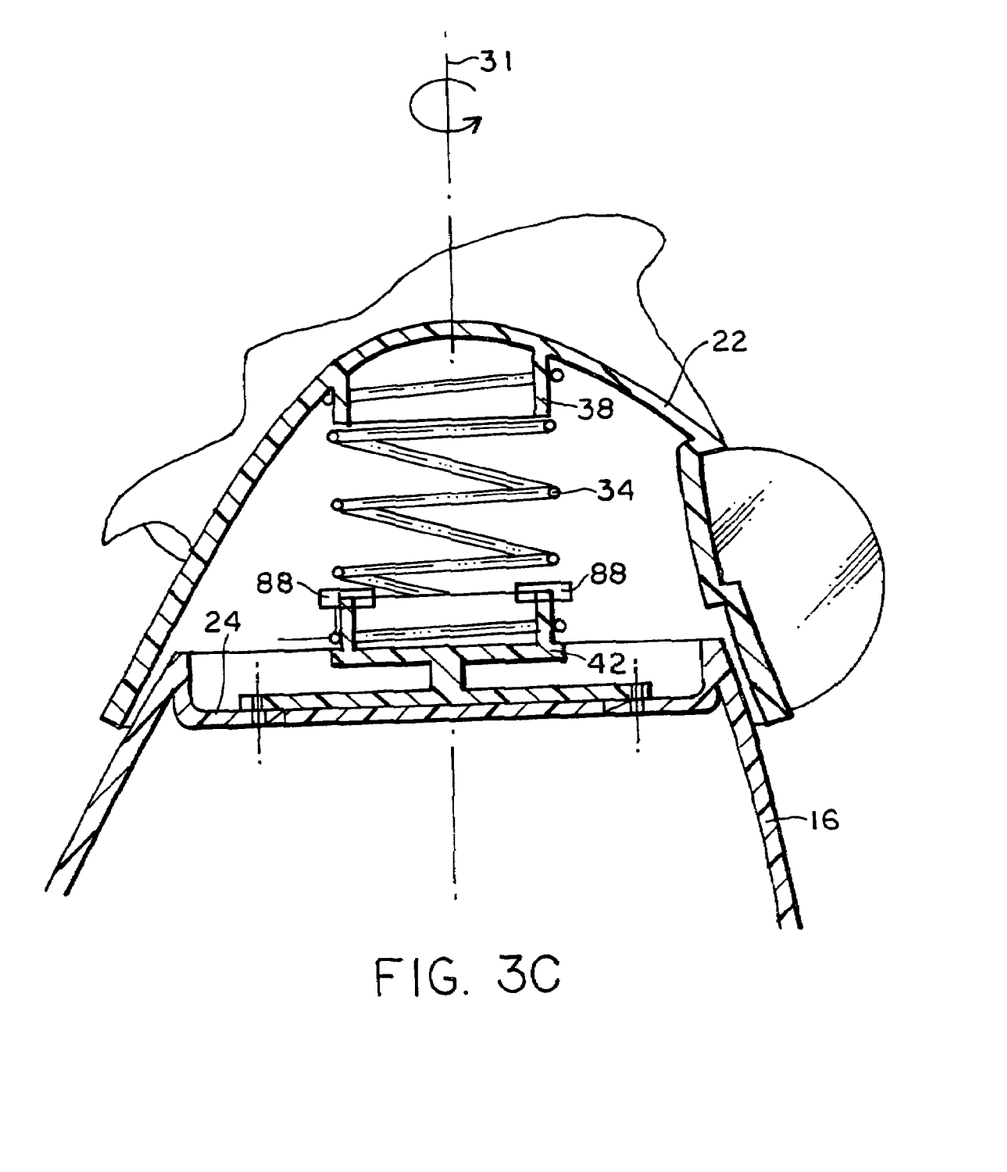
FIG. 3C shows a cross-sectional view of the owl head of the present invention with rotational engagements located on the body attachment mechanism.

As mentioned above, the head of the owl may move rotationally around a central vertical axis of the owl. Such movement is designed to simulate the turning of a natural owls head so as to impart an "alive" look to the owl replica. The coupling of the head and the body of the owl may be accomplished in a wide range of manners while still allowing for the multidimensional spring movement of the head. FIGS. 3A-3C illustrate some of the ways in which a rotational coupling between the head and the body may be accomplished but it will be recognized that the advantageous techniques disclosed herein in are not limited to the particular mechanisms shown.

FIG. 3A shows a cross-section of a one embodiment of the owl head wherein the spring 34 is attached in a manner such that the spring rotates along with the head 22. As shown, the spring may be fixedly attached to the head attachment mechanism 38 and the body attachment mechanism 42. The body attachment mechanism may include extensions 62 as shown. Rotational engagement or coupling structures 66 at the coupling point of the upper region 24 of the body 16 and the body attachment mechanism 42 allow the body attachment mechanism 42 to move rotationally with respect to the body 16. The rotational engagement or coupling structures 66 may be any number of coupling mechanisms as is known in the mechanical arts, such as for example, bearings, gears, etc. Thus, rotational movement about the central vertical axis 31 may be achieved.

In another embodiment, the spring may remain fixed relative to the body such that the spring does not rotate when the head rotates. FIG. 3B shows a cross-section of such an embodiment. As shown in FIG. 3B, the spring 34 may be fixedly attached to the body attachment mechanism 42. However, rotational engagement or coupling structures 70 may be located at the coupling point between the spring 34 and the head attachment mechanism 38. Thus, rotational movement about the central vertical axis 31 may be achieved.

In another embodiment, the body attachment mechanism 42 may remain fixed relative to the body however the spring may rotate as the head rotates. FIG. 3C shows a cross-section of such an embodiment. As shown in FIG. 3C, the spring 34 may be fixedly attached to the head attachment mechanism 38. Further the body attachment mechanism 42 may be fixedly attached to the upper region 24 of the body 16. However, rotational engagement or coupling structures 88 may be located at the coupling point between the spring 34 and the body attachment mechanism 42. Thus, rotational movement about the central vertical axis 31 may be achieved. While FIGS. 3A, 3B, and 3C show rotational engagements located at different points on a body attachment mechanism and a head attachment mechanism, it is understood that the invention could include one embodiment, a combination of two or more of these embodiments or other embodiments. Though the body and head attachment mechanisms are shown to include arm like extensions, it will be recognized that other attachment mechanisms may be utilized or that the attachment mechanism may merely be a portion of the walls of the head or body or the attachment mechanism may merely be glue or other materials that adhere the spring to one of the head or body.

Thus, as provided herein a predator replica is provided that may have a head movement that is both a rotational movement about a central vertical axis and a multidimensional spring actuated movement. The movement of the predator head may be increased through the use of a fin member that is configured to increase the wind engagement of the predator head.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A predator replica, comprising:
    a movable head;
    a wind engaging member coupled to the movable head, the wind engaging member being distinct from replica features of the predator replica, the wind engaging member assisting rotational movement of the movable head;
    a body, the wind engaging member assisting rotational movement of the movable head with respect to the body; and
    a spring for coupling the head to the body,
    wherein the spring is fixed relative to the body so that the spring does not rotate when the head rotates.

2. The predator replica of claim 1, wherein the spring is fixed relative to the head so that the spring rotates when the head rotates.

3. The predator replica of claim 2, further comprising rotational engagement structures coupled to an upper region of the body and to the spring.

4. The predator replica of claim 1, further comprising rotational engagement structures coupled to the head and to the spring.

5. The predator replica of claim 1, wherein the spring provides for multidimensional spring actuated movement.

6. The predator replica of claim 1 wherein the head is attached in a suspended position above body via the spring.

7. The predator replica of claim 1 wherein the wind engaging member is removably attached to the head.

8. The predator replica of claim 7 wherein the wind engaging member is attached to the head vertically.

9. The predator replica of claim 7 wherein the wind engaging member is a fin attached to the head via a slot in an exterior of the head.

10. An owl replica comprising:
    an owl body;
    an owl head extending downward and overlapping at least a portion of the owl body such that at least a portion of the owl head overlaps at least a portion of an exterior surface of the owl body in a manner that the portion of the exterior surface is inward of the overlapping portion of the owl head with respect to a central vertical axis of the owl body;

a gap located between the owl body and the portion of the owl head that overlaps the owl body;

a spring coupling the owl head and the owl body in a manner that allows for multidimensional movement of the owl head relative to the owl body;

a rotational movement mechanism coupled between the owl head and the owl body so that the owl head may rotate with relation to the owl body.

11. The owl of claim 10 further comprising a fin configured to engage wind so that the probability of movement of the head is increased.

12. The owl of claim 11 wherein said fin is detachable.

13. The owl of claim 11 wherein head is attached in a suspended position above body.

14. An owl replica with a head having a bobble motion, comprising:
a body having a plurality of owl-like features;
a spring for connecting the head to the body to provide head movement;
a head attachment mechanism for attaching the head to the spring;
a body attachment mechanism for attaching the spring to body; and
at least one rotational coupling structure coupled to the spring, head or body so that the head may rotate about a central vertical axis of the owl replica, the rotational coupling structure allowing rotation between a head end of the spring and the head or between a body end of the spring and the body.

15. The owl replica of claim 14 wherein the rotational coupling structure is located at an upper region of the body.

16. The owl replica of claim 14 wherein the rotational coupling structure is located at an end of the spring.

17. The owl replica of claim 14 wherein the head is attached in a suspended position above the body.

18. The owl replica of claim 17 further comprising a fin vertically attached to the exterior of the head, the fin being configured to engage wind.

19. The owl replica of claim 18 wherein the fin is detachably from the head.

20. The owl replica of claim 18 wherein the spring allows for multidimensional movement of the owl head relative to the owl body.

* * * * *